(12) United States Patent
Chang et al.

(10) Patent No.: US 11,762,195 B2
(45) Date of Patent: Sep. 19, 2023

(54) HOLOGRAPHIC DISPLAY SYSTEM WITH CONJUGATE IMAGE REMOVAL FOR A MOTOR VEHICLE

(71) Applicant: GM Global Technology Operations LLC, Detroit, MI (US)

(72) Inventors: Kai-Han Chang, Madison Heights, MI (US); Thomas A. Seder, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 72 days.

(21) Appl. No.: 17/313,134

(22) Filed: May 6, 2021

(65) Prior Publication Data

US 2022/0357574 A1   Nov. 10, 2022

(51) Int. Cl.
| | |
|---|---|
| *G02B 27/01* | (2006.01) |
| *G02B 5/18* | (2006.01) |
| *G02B 5/04* | (2006.01) |
| *B60K 35/00* | (2006.01) |

(52) U.S. Cl.
CPC .......... *G02B 27/0101* (2013.01); *G02B 5/04* (2013.01); *G02B 5/1842* (2013.01); *B60K 35/00* (2013.01); *B60K 2370/29* (2019.05); *B60K 2370/52* (2019.05); *G02B 2027/014* (2013.01)

(58) Field of Classification Search
CPC .... G03B 21/00–64; G02B 27/01–0189; G02B 2027/0105–0198
See application file for complete search history.

(56) References Cited

U.S. PATENT DOCUMENTS

| | | |
|---|---|---|
| 8,072,686 B2 | 12/2011 | Cui et al. |
| 8,098,171 B1 | 1/2012 | Szczerba et al. |
| 8,164,543 B2 | 4/2012 | Seder et al. |
| 8,269,652 B2 | 9/2012 | Seder et al. |
| 8,317,329 B2 | 11/2012 | Seder et al. |
| 8,330,673 B2 | 12/2012 | Cui et al. |
| 8,344,894 B2 | 1/2013 | Szczerba |
| 8,350,724 B2 | 1/2013 | Szczerba et al. |
| 8,358,224 B2 | 1/2013 | Seder et al. |
| 8,384,531 B2 | 2/2013 | Szczerba et al. |
| 8,384,532 B2 | 2/2013 | Szczerba et al. |
| 8,395,529 B2 | 3/2013 | Seder et al. |
| 8,427,395 B2 | 4/2013 | Seder et al. |

(Continued)

*Primary Examiner* — Bao-Luan Q Le
*Assistant Examiner* — Christopher A Lamb, III
(74) *Attorney, Agent, or Firm* — Vivacqua Crane PLLC (57) ABSTRACT

A holographic display system for a motor vehicle includes a coherent light source for generating a beam of coherent light and a spatial light modulator (SLM) having a two-dimensional pixel array, which is encoded with a hologram for modulating a phase of the coherent light. The SLM generates a first diffracted beam associated with a main image and a second diffracted beam associated with a conjugate image, where the first and second diffracted beams are angularly spaced from one another by a first angle. The system further includes an optical component for angularly spacing the first and second diffracted beams from one another by a second angle that is larger than the first angle. The system further includes a display surface receiving the first diffracted beam from the optical component to display the main image, with the display surface being free of the second diffracted beam.

5 Claims, 5 Drawing Sheets

(56) References Cited

U.S. PATENT DOCUMENTS

| | | | |
|---|---|---|---|
| 8,482,486 | B2 | 7/2013 | Seder et al. |
| 8,564,502 | B2 | 10/2013 | Cui et al. |
| 8,629,784 | B2 | 1/2014 | Szczerba et al. |
| 8,692,739 | B2 | 4/2014 | Mathieu et al. |
| 8,704,653 | B2 | 4/2014 | Seder et al. |
| 8,817,090 | B2 | 8/2014 | Szczerba et al. |
| 8,830,141 | B2 | 9/2014 | Seder et al. |
| 8,912,978 | B2 | 12/2014 | Szczerba et al. |
| 9,030,515 | B2 | 5/2015 | Stowe et al. |
| 9,162,622 | B2 | 10/2015 | Szczerba et al. |
| 9,688,287 | B2 | 6/2017 | Seder et al. |
| 9,905,170 | B2 | 2/2018 | Carpenter et al. |
| 10,302,937 | B2 | 5/2019 | Ferris et al. |
| 10,423,038 | B2 | 9/2019 | Seder et al. |
| 10,629,852 | B2 | 4/2020 | Chang et al. |
| 10,747,314 | B1 | 8/2020 | Chang et al. |
| 10,860,093 | B1 | 12/2020 | Chang et al. |
| 10,880,529 | B2 | 12/2020 | Chang et al. |
| 2017/0161949 | A1 | 6/2017 | Seder et al. |
| 2018/0314065 | A1* | 11/2018 | Li ............................ B60K 35/00 |
| 2019/0041797 | A1* | 2/2019 | Christmas ................. G03H 1/16 |
| 2021/0005549 | A1 | 1/2021 | Zhu |
| 2021/0294100 | A1* | 9/2021 | Lin ....................... G02B 27/283 |

\* cited by examiner

HOLOGRAPHIC DISPLAY SYSTEM WITH CONJUGATE IMAGE REMOVAL FOR A MOTOR VEHICLE

INTRODUCTION

The present disclosure relates to holographic display systems for motor vehicles, and more particularly to a holographic display system that angularly spaces a main image from a conjugate image to display only the main image on a display surface and improve overall image quality.

Car manufacturers are continuously investigating improvements to Augmented Reality (AR) Head-Up-Displays (HUD) having spatial light modulators (SLMs). In an AR HUD where the phase modulation capability of the SLM is not equal to $2\pi$, a conjugate image will appear in the same field of view as a main image so as to reduce image quality. Modern luxury or premium vehicles can include AR HUDs with spatial light modulators (SLMs) that remove conjugate images by finely tuning the SLMs for red, green and blue and providing $2\pi$-phase modulation at each color. However, as compared to SLMs that are not modified to provide the $2\pi$ phase modulation, the SLM that modulates a red laser requires a thicker cell gap or liquid crystal with higher birefringence, which leads to a longer response time.

Thus, while existing holographic display systems achieve their intended purpose, there is a need for a new and improved holographic display system that addresses these issues.

SUMMARY

According to several aspects of the present disclosure, a holographic display system is provided for a motor vehicle. The system includes a coherent light source for generating a beam of coherent light. The system further includes a spatial light modulator (SLM) having a two-dimensional pixel array. The two-dimensional pixel array is encoded with holograms for modulating a phase of the coherent light and generating a first diffracted beam associated with a main image and a second diffracted beam associated with a conjugate image, where the first and second diffracted beams are angularly spaced from one another by a first angle. The system further includes an optical component for transmitting at least one of the first and second diffracted beams and angularly spacing the first and second diffracted beams from one another by a second angle that is larger than the first angle. The system further includes a display surface disposed relative to the optical component to receive the first diffracted beam from the optical component and display the main image, with the display surface being free of the second diffracted beam. The system further includes a computer having a processor coupled to the coherent light source and the SLM. The computer further has a memory including instructions such that the processor is programmed to control the two-dimensional pixel array of the SLM to generate the first and second diffracted beams.

In one aspect, the SLM is capable of producing a phase shift within a range between 0 and $2\pi$, where an actual range of the phase shift is not equal to $2\pi$.

In another aspect, the coherent light source is a LASER.

In another aspect, the SLM is a liquid crystal on silicon (LCoS) SLM.

In another aspect, the optical component is a diffractive grating for diffracting at least one of the first and second diffracted beams.

In another aspect, the optical component is a refractive prism for refracting at least one of the first and second diffracted beams.

According to several aspects of the present disclosure, a motor vehicle includes a body that defines a passenger cabin. The motor vehicle further includes a plurality of reflective surfaces surrounding the passenger cabin, with the reflective surfaces including at least one of a mirror, a front windshield, a rear windshield, a sunroof, and a plurality of side windows surrounding the passenger cabin. The motor vehicle further includes a holographic display system (system) that is coupled to the body. The system includes a coherent light source for generating a beam of coherent light. The system further includes a spatial light modulator (SLM) having a two-dimensional pixel array. The two-dimensional pixel array is encoded with holograms for modulating a phase of the coherent light and generating a first diffracted beam associated with a main image and a second diffracted beam associated with a conjugate image, where the first and second diffracted beams are angularly spaced from one another by a first angle. The system further includes an optical component for transmitting at least one of the first and second diffracted beams and angularly spacing the first and second diffracted beams from one another by a second angle, with the second angle being larger than the first angle. The system further includes a display surface disposed relative to the optical component to receive the first diffracted beam from the optical component and display the main image, with the display surface being free of the second diffracted beam. The system further includes a computer having a processor coupled to the coherent light source and the SLM. The computer further has a memory including instructions such that the processor is programmed to control the two-dimensional pixel array of the SLM to generate the first and second diffracted beams.

In one aspect, the display surface is a portion of at least one of the mirror, the front windshield, the rear windshield, the sunroof, the side windows.

In another aspect, the system further includes a combiner glass disposed within the passenger cabin, and the display surface is a portion of the combiner glass.

In another aspect, the SLM is capable of producing a phase shift within a range between 0 and $2\pi$, where an actual range of the phase shift is not equal to $2\pi$.

In another aspect, the coherent light source is a LASER.

In another aspect, the SLM is a liquid crystal on silicon (LCoS) SLM.

In another aspect, the optical component is a diffractive grating for diffracting at least one of the first and second diffracted beams.

In another aspect, the optical component is a refractive prism for refracting at least one of the first and second diffracted beams.

According to several aspects of the present disclosure, a method is provided for operating a holographic display system for a motor vehicle. The system includes a coherent light source, a spatial light modulator (SLM) having a two-dimensional pixel array, an optical component, a display surface, and a computer having a processor and a memory. The method includes the coherent light source generating a beam of coherent light. The method further includes the SLM modulating a phase of the coherent light that generates a first diffracted beam associated with a main image and a second diffracted beam associated with a conjugate image, where the first and second diffracted beams are angularly spaced from one another by a first angle. The method further includes the optical component angularly spacing the first and second diffracted beams from one another by a second angle, with the second angle being larger than the first angle. The method further includes the processor controlling the two-dimensional pixel array of the SLM that generates the first and second diffracted beams.

In one aspect, the method further includes the SLM producing a phase shift of the coherent light, where an actual range of the phase shift is not equal to $2\pi$.

In another aspect, the method further includes a LASER generating the beam of coherent light.

In another aspect, the method further includes a liquid crystal on silicon (LCoS) SLM modulating the phase of the coherent light to generate the first and second diffracted beams.

In another aspect, the method further includes a diffractive grating diffracting at least one of the first and second diffracted beams.

In another aspect, the method further includes a refractive prism for refracting at least one of the first and second diffracted beams.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

The present disclosure describes one example of a motor vehicle having a holographic display system (system) 100 that angularly separates a conjugate image from a main image for displaying only the main image on a display surface. One non-limiting example of the system 100 includes an Augmented Reality (AR) Head-Up Display (HUD) that can blend holographic display elements with other display elements or environmental characteristics to make holographic images appear in relation to the physical world. As described in detail for the non-limiting examples below, the system 100 includes a spatial light modulator (SLM) 102 with a two-dimensional pixel array 104. The system 100 further includes a computer for controlling the SLM 102 that displays a main image and a conjugate image with an intrinsic angle between one another, and the system further includes a diffractive or refractive optical component for enlarging the angular separation between the main image and the conjugate image. The system may be used as part of any land, sea, or air vehicle. In other non-limiting examples, the system may be used as part of a stationary or mobile power plant, a robot, or a platform. For illustrative consistency, an application of the system as an integral part of the motor vehicle will be described hereinafter without limiting the present disclosure to such an implementation.

Figure 1:
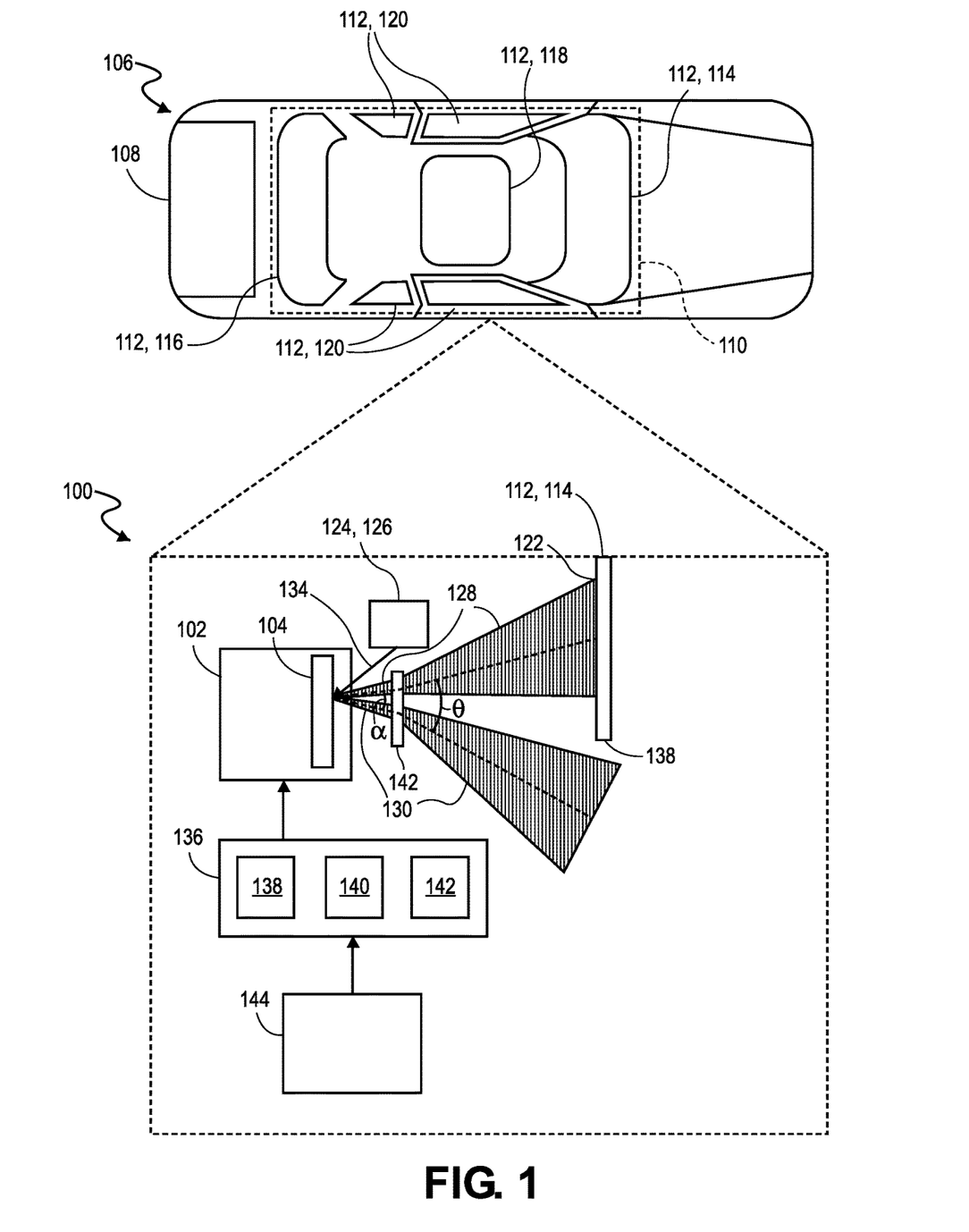
FIG. 1 is a schematic view of one example of a motor vehicle having a holographic display system.

Referring to FIG. 1, one example of a motor vehicle 106 includes a body 108 defining a passenger cabin 110 (FIG. 2) and a plurality of reflective surfaces 112 surrounding the passenger cabin 110. The reflective surfaces 112 can include at least one of a front windshield 114, a rear windshield 116, a sunroof 118, and a plurality of side windows 120 surrounding the passenger cabin 110.

Figure 2:
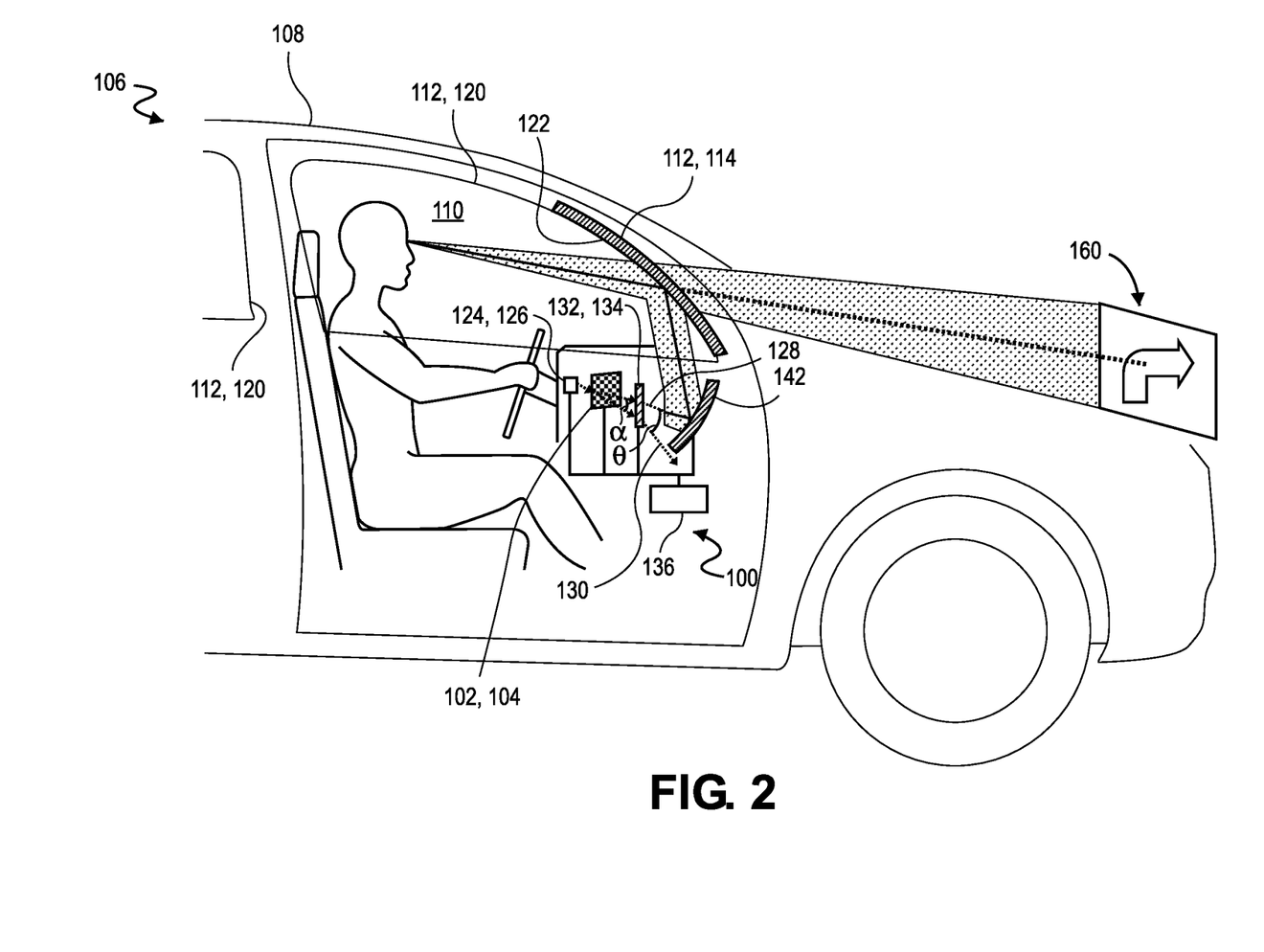
FIG. 2 is a schematic view of a passenger cabin of the motor vehicle of FIG. 1, illustrating one example of the system having a front windshield with a display surface.
Figure 3:
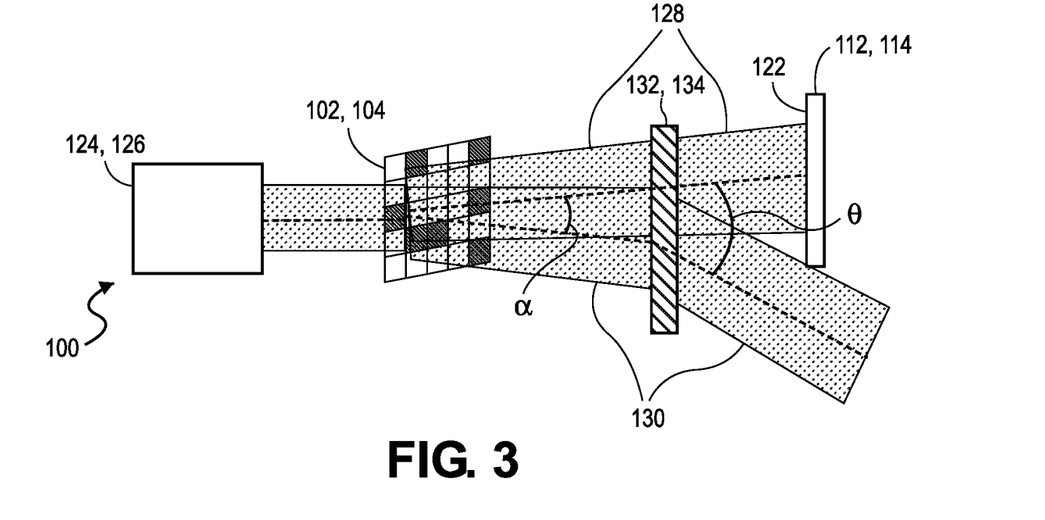
FIG. 3 is a schematic view of one example of the system of FIG. 2, illustrating the system including a diffractive grating for angularly separating the first and second diffractive beams.

As best shown in FIGS. 2 and 3, the motor vehicle 106 further includes a holographic display system 100 (system) coupled to the body 108. The system 100 includes a display surface 122. One non-limiting example of the display surface 122 can be an integral portion of the front windshield 114. In other non-limiting examples, the display surface 122 can be a portion of the rear windshield 116 (FIG. 1), the sunroof 118, the side windows 120, or other suitable portions of the vehicle 106.

Referring back to FIG. 1, the system 100 further includes a coherent light source 124 for generating a beam of coherent light. One non-limiting example of the light source 124 can include a LASER 126. While a single LASER 126 is depicted in FIG. 1, it is contemplated that the system can include two or more LASERS, such as separate red, green, and blue LASERS.

The system 100 further includes the spatial light modulator (SLM) 102 having the two-dimensional pixel array 104. In this non-limiting example, the SLM 102 is capable of producing a phase shift within a range between 0 and $2\pi$, where an actual range of the phase shift is not equal to $2\pi$. However, it is contemplated that other examples of the SLM may be configured to produce a phase shift that is equal to $2\pi$. The two-dimensional pixel array 104 is encoded with holograms for modulating a phase of the coherent light and generating a first diffracted beam 128 associated with a main image and a second diffracted beam 130 associated with a conjugate image, where the first and second diffracted beams 128, 130 are angularly spaced from one another by a first angle $\alpha$. The SLM is a fast-switching high-pixel density spatial light modulator (SLM) with driving circuitry to provide a high-frame rate. The high frame rate can be a 60 Hz frame rate, such that the SLM displays a sequence of subframes in a time sequential manner at a rate that the human eye does not perceive a flicker while viewing the whole field of view. However, it is contemplated that the frame rate can be above or below 60 Hz. In one non-limiting example, the two-dimensional pixel array 104 is a liquid crystal on silicon (LCoS) two-dimensional pixel array 104 that provides diffractive phase elements to support holographic projection. In other examples, the spatial light modulators may be MEMS shutter displays or DLP DMD arrays. The spatial light modulators may be independently controlled to block, transmit, or reflect different rays on a high-resolution basis.

As best shown in FIG. 3, the system 100 further includes an optical component 132 for transmitting at least one of the first and second diffracted beams 128, 130 and angularly spacing the first and second diffracted beams 128, 130 from one another by a second angle θ, with the second angle θ being larger than the first angle α. One non-limiting example of the optical component 132 is a diffractive grating 134 for diffracting at least one of the first and second diffracted beams 128, 130. The diffractive grating 134 transmits and diffracts only the first diffracted beam 128, such that the first diffracted beam 128 is angularly spaced from the second diffracted beam 130 by the second angle θ and the intrinsic angular separation produced by the SLM 102 is further expanded. The diffractive grating 134 can be fabricated via a holographic method in photopolymer, liquid crystal reactive monomer, or glass forming technology inducing periodic refractive index modulation.

Referring back to FIG. 1, the system 100 further includes a computer 136 having a processor 138 coupled to the light source 124 and the SLM 102. The processor 138 can be used to compute image data in real-time to be output on the two-dimensional pixel array 104 of the SLM 102. The processor 138 can include processing circuitry that may include an application specific integrated circuit (ASIC), an electronic circuit, and a processor (shared, dedicated, or group). The computer 136 can further include a memory 140 that executes one or more software or firmware programs, a combinational logic circuit, and/or other suitable components that provide the described functionality. The processor 138 can include an input/output interface 142 for communicating with various components, such as an input frame source 144 and the SLM 102. When the system 100 is incorporated in a vehicle, the input frame source 144 can be a vehicle control unit, for instance, to display gauge values, logos, information, entertainment content, or other such image-based data.

The processor 138 may be communicatively coupled to, e.g., via the vehicle communications module, more than one local processor, e.g., included in electronic processor units (ECUs) or the like included in the vehicle 100 for monitoring and/or controlling various vehicle components. The processor 138 is generally arranged for communications on the vehicle communications module via an internal wired and/or wireless network, e.g., a bus or the like in the vehicle 106, such as a controller area network (CAN) or the like, and/or other wired and/or wireless mechanisms. Via the vehicle communications module, the processor 138 may transmit messages to various devices in the vehicle 106 and/or receive messages from the various devices, e.g., vehicle sensors, actuators, vehicle components, a human machine interface (HMI), etc. Alternatively or additionally, in cases where the processor comprises a plurality of devices, the vehicle communications network may be used for communications between devices represented as the computer 136 in this disclosure. Further, as mentioned below, various processors and/or vehicle sensors may provide data to the computer 136. The processor 138 can receive and analyze data from sensors substantially continuously and/or periodically. Further, object classification or identification techniques can be used, e.g., in a processor 138 based on lidar sensor, camera sensor, etc., data, to identify the lane markings, a type of object, e.g., vehicle, person, rock, pothole, bicycle, motorcycle, etc., as well as physical features of objects.

The memory 140 includes one or more forms of computer readable media, and stores instructions executable by the processor 138 for performing various operations, including as disclosed herein. The memory 140 further includes instructions such that the processor 138 is programmed to control the two-dimensional pixel array 104 of the SLM 102 to modulate the beam of coherent light and generate the first and second diffracted beams 128, 130.

Figure 4:
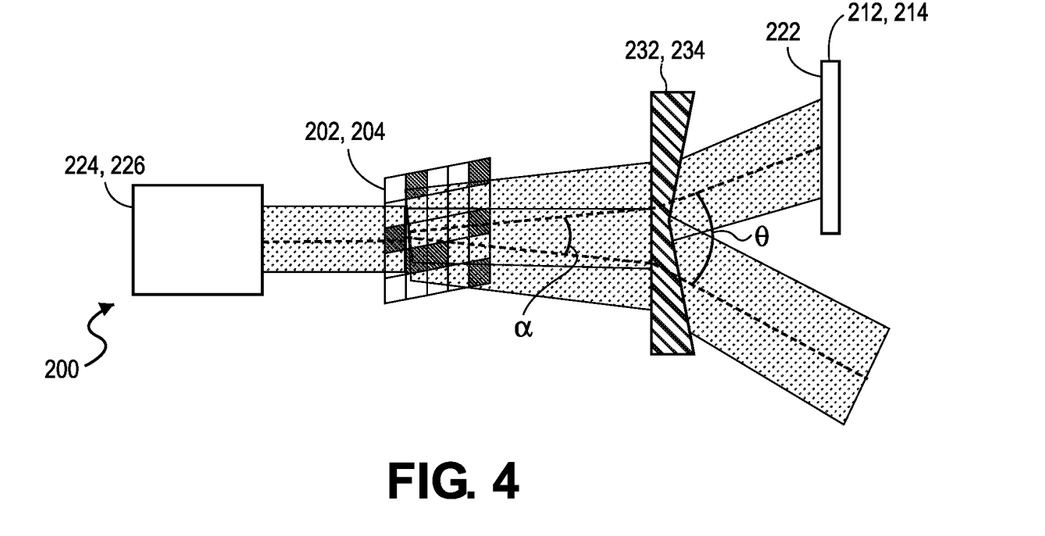
FIG. 4 is a schematic view of another example of the system of FIG. 2, illustrating the system including a refractive prism for angularly separating the first and second diffractive beams.

Referring to FIG. 4, another example of a holographic display system 200 is similar to the system 100 of FIG. 3 and has the same components identified by the same numbers increase by 100. However, while the system 100 of FIG. 3 includes the optical component 132 in the form of a diffractive grating 134, the system 200 includes an optical component 232 in the form of a refractive prism 248 that transmits and refracts at least one of the first and second diffracted beams 228, 230.

Figure 5:
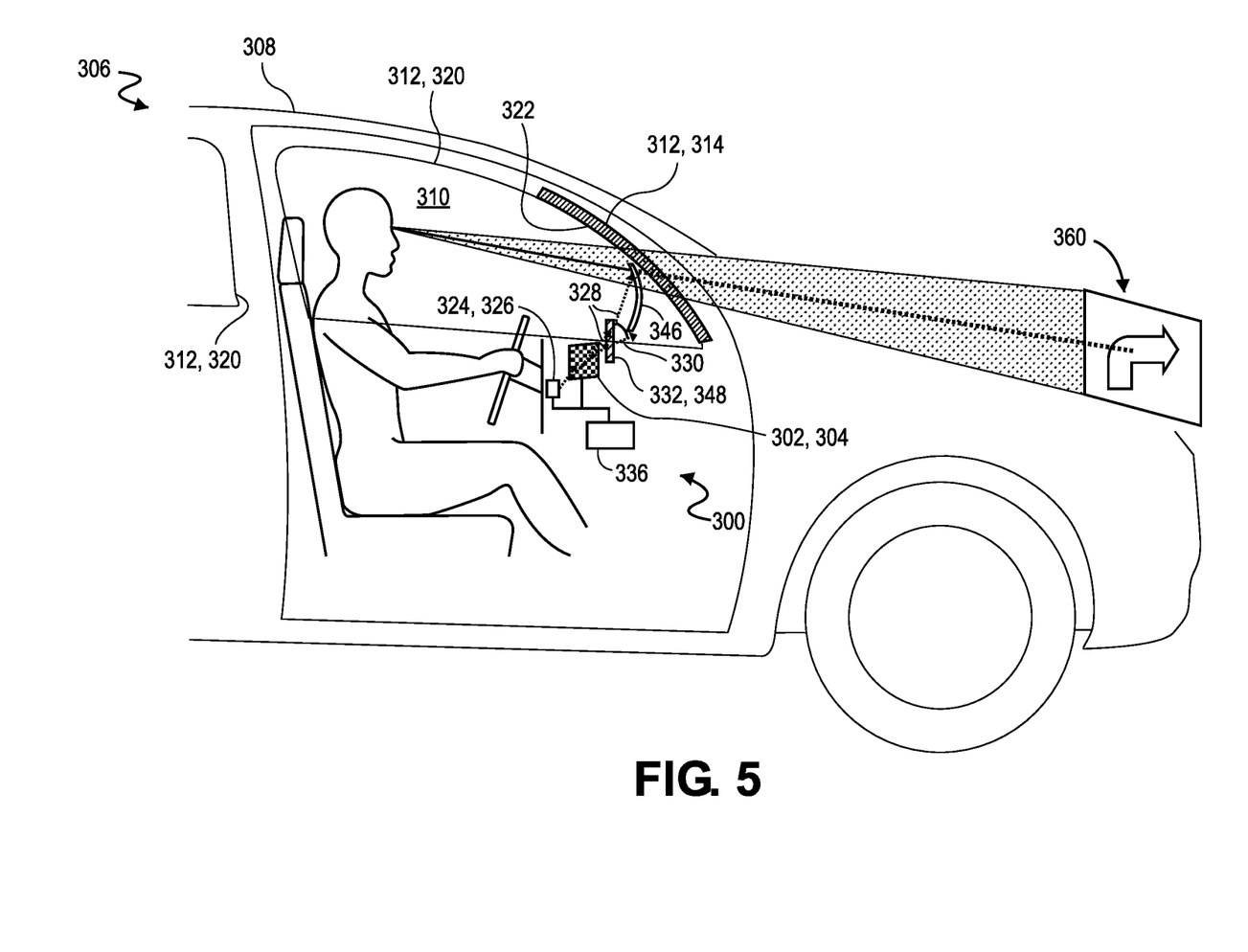
FIG. 5 is a schematic view of a passenger cabin of the motor vehicle of FIG. 1, illustrating another example of the system having a combiner glass with a display surface.

Referring to FIG. 5, another example of a holographic display system 300 is similar to the system 100 of FIG. 2 and has the same components identified by the same numbers increase by 200. However, while the system 100 of FIG. 2 includes the display surface 122 in the form of a cabin-facing surface of the front windshield 114, the system 300 includes a combiner glass 346 that is separate from the front windshield 314 and disposed within the passenger cabin 310, and the display surface 322 is a portion of the combiner glass 346.

Figure 6:
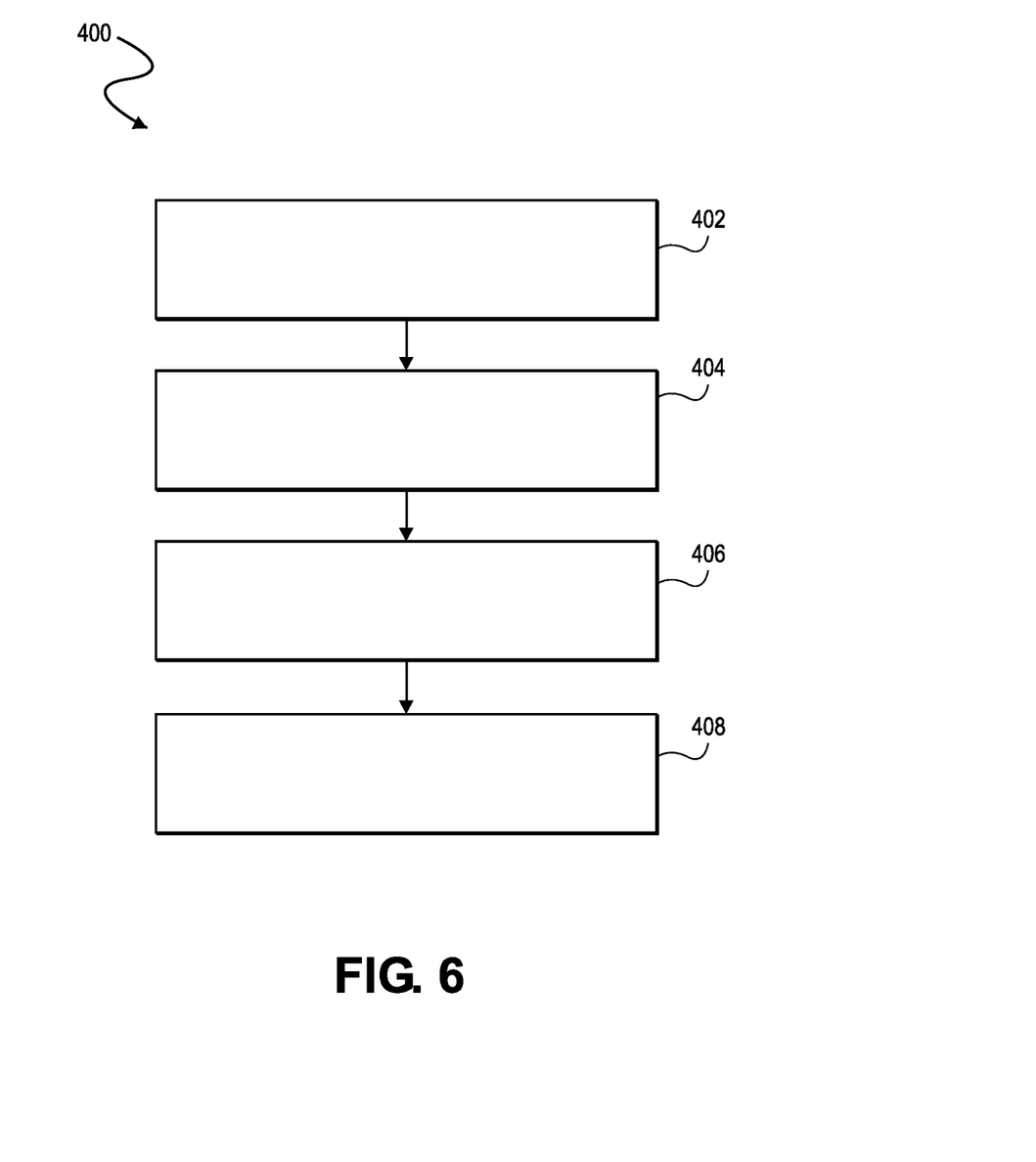
FIG. 6 is a flow chart of an exemplary method of operating the holographic display system of FIG. 1.

Referring to FIG. 6, a method 400 is provided for operating the holographic display system 100 for the motor vehicle 106. The method 400 begins at block 402 with the processor generating a first actuation signal and the light source 124 generating the beam of encoded light, in response to the light source 124 receiving the first actuation signal from the processor 138. In this non-limiting example, the LASER 126 generates the beam of coherent light. However, it is contemplated that the system can include two or more LASERS, such as separate red, green, and blue LASERS.

At block 404, the processor 138 generates a second actuation signal for controlling the two-dimensional pixel array of the SLM 102 that generates the first and second diffracted beams 128, 130, in response to the SLM 102 receiving the second actuation signal from the processor 138. More specifically, the SLM 102 is a liquid crystal on silicon (LCoS) SLM that modulates the phase of the coherent light to generate the first diffracted beam 128 that is associated with the main image and the second diffracted beam 130 that is associated with the conjugate image, where the first and second diffracted beams 128, 130 are angularly spaced from one another by the first angle α. In this non-limiting example, the SLM 102 produces a phase shift of coherent light, where an actual range of the phase shift is not equal to $2\pi$. However, in other examples, the SLM produces a phase shift that is equal to $2\pi$.

At block 406, the optical component 132 angularly spaces the first and second diffracted beams 128, 130 from one another by the second angle θ that is larger than the first angle α. In one non-limiting example, the optical component 132 is the diffractive grating 134 that diffracts at least one of the first and second diffracted beams 128, 130. In another non-limiting example (FIG. 4), the optical component 232 is the refractive prism 248 that refracts at least one of the first and second diffracted beams 228, 230.

As described in this disclosure, computers and computing devices generally include computer executable instructions, where the instructions may be executable by one or more computing devices such as those listed above. Computer executable instructions may be compiled or interpreted from computer programs created using a variety of programming languages and/or technologies, including, without limitation, and either alone or in combination, JAVA, C, C++, MATLAB, SIMULINK, STATEFLOW, VISUAL BASIC, JAVA SCRIPT, PERL, HTML, TENSORFLOW, PYTORCH, KERAS, etc. Some of these applications may be compiled and executed on a virtual machine, such as the JAVA VIRTUAL MACHINE, the DALVIK virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer readable medium (also referred to as a processor readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A holographic display system for a motor vehicle, the holographic display system comprising:
a coherent light source for generating a beam of coherent light;
a spatial light modulator (SLM) comprising a two-dimensional pixel array for modulating a phase of the coherent light and generating a first diffracted beam associated with a main image and a second diffracted beam associated with a conjugate image, where the first and second diffracted beams are angularly spaced from one another by a first angle, wherein the SLM comprises a liquid crystal on silicon (LCoS) SLM and the SLM is capable of producing a phase shift within a range between 0 and $2\pi$, where an actual range of the phase shift is not equal to $2\pi$;
an optical component for transmitting at least one of the first and second diffracted beams and angularly spacing the first and second diffracted beams from one another by a second angle that is larger than the first angle, and the optical component comprises a diffractive grating for diffracting at least one of the first and second diffracted beams;
a display surface disposed relative to the optical component to receive the first diffracted beam from the optical component and display the main image, with the display surface being free of the second diffracted beam; and
a computer comprising:
a processor coupled to the coherent light source and the SLM; and a memory including instructions such that the processor is programmed to control the two-dimensional pixel array of the SLM that generates the first and second diffracted beams.

2. The holographic display system of claim 1 wherein the coherent light source is a LASER.

3. A motor vehicle comprising:
a body defining a passenger cabin;
a plurality of reflective surfaces surrounding the passenger cabin, with the reflective surfaces including at least one of a mirror, a front windshield, a rear windshield, a sunroof, and a plurality of side windows surrounding the passenger cabin; and
a holographic display system coupled to the body and comprising:
a coherent light source for generating a beam of coherent light;
a spatial light modulator (SLM) comprising a two-dimensional pixel array for modulating a phase of the coherent light and generating a first diffracted beam associated with a main image and a second diffracted beam associated with a conjugate image, where the first and second diffracted beams are angularly spaced from one another by a first angle, wherein the SLM comprises a liquid crystal on silicon (LCoS) SLM and the SLM is capable of producing a phase shift within a range between 0 and $2\pi$, where an actual range of the phase shift is not equal to $2\pi$;
an optical component for transmitting at least one of the first and second diffracted beams and angularly spacing the first and second diffracted beams from one another by a second angle that is larger than the first angle, wherein the optical component comprises a refractive prism;
a display surface disposed relative to the optical component to receive the first diffracted beam from the optical component and display the main image, with the display surface being free of the second diffracted beam, wherein the display surface comprises a portion of a combiner glass on at least one of the front windshield, the rear windshield, the sunroof, and the side windows; and
a computer comprising:
a processor coupled to the coherent light source and the SLM; and
a memory including instructions such that the processor is programmed to control the two-dimensional pixel array of the SLM that generates the first and second diffracted beams.

4. The motor vehicle of claim 3 wherein the coherent light source is a LASER.

5. A method of operating a holographic display system for a motor vehicle, the holographic display system including a coherent light source, a spatial light modulator (SLM) comprising a two-dimensional pixel array, an optical component, a display surface, and a computer having a processor and a memory, the method comprising:
generating, using the coherent light source that is a LASER, a beam of coherent light;
modulating, using the SLM, a phase of the coherent light, where an actual range of the phase shift is not equal to $2\pi$, that generates a first diffracted beam associated with a main image and a second diffracted beam associated with a conjugate image, where the first and second diffracted beams are angularly spaced from one another by a first angle, wherein the SLM is a liquid crystal on silicon (LCoS) SLM, and wherein one of the first and second diffracted beams are diffracted using a diffractive grating;
angularly spacing, using the optical component, the first and second diffracted beams from one another by a second angle that is larger than the first angle; and
controlling, using the processor, the two-dimensional pixel array of the SLM that generates the first and second diffracted beams.

* * * * *